May 15, 1923.

W. H. JOYNER

SURGICAL SAW

Filed June 22, 1921

1,455,621

Inventor
W. H. Joyner,
By ⟨signature⟩
Attorney

Patented May 15, 1923.

1,455,621

UNITED STATES PATENT OFFICE.

WILLIAM H. JOYNER, OF EAST BERNSTADT, KENTUCKY.

SURGICAL SAW.

Application filed June 22, 1921. Serial No. 479,595.

*To all whom it may concern:*

Be it known that WILLIAM H. JOYNER, a citizen of the United States of America, residing at East Bernstadt, in the county of Laurel and State of Kentucky, has invented new and useful Improvements in Surgical Saws, of which the following is a specification.

The object of the invention is to provide a simple and efficient saw for removing plaster casts used surgically for maintaining members in their proper relative positions during setting operations and the like and designed especially for facilitating convenience in manipulation; and with this object in view the invention consists in a construction and combination of parts of which a preferred embodiment is shown in the accompanying drawings, wherein.

Figure 1:
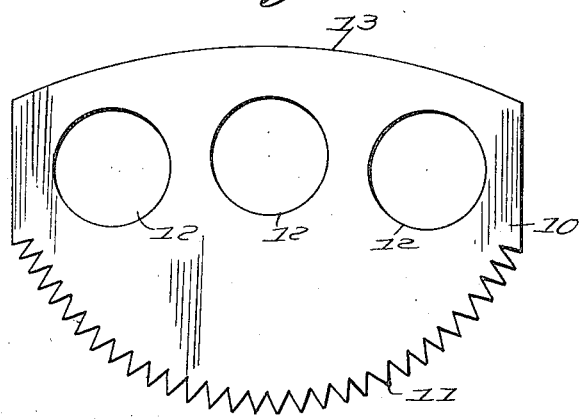
Figure 1 is a side view.
Figure 2:
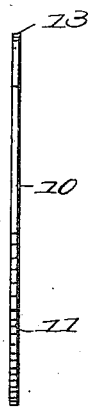
Figure 2 is an edge view of a saw embodying the invention.

The device consists of a plate 10 of suitably tempered steel or equivalent material of substantially elliptical form having an arcuate cutting edge 11 of an extent approximately one-half of the circumference of the blank between the extremities of the long diameter thereof, the plate being provided with a plurality of finger holes 12 of which three are shown in the drawing designed to receive respectively the index, middle and third fingers of the hand of the operator so as to maintain the blade in a firm position, the convexed smooth or back edge 13 forming a suitable rest for the thumb of the operator's hand.

The contour of the toothed or cutting edge is such as to adapt it for making comparatively long cuts and of operating the device by a rocking movement and also of working within a comparatively restricted area when the condition of the cast is such as to make the same necessary while the construction of the device adapts it to be formed from a single plate of metal and hence at a moderate cost.

Having described the invention, what is claimed as new and useful is:—

A saw for the purpose indicated having a substantially elliptical blade provided with an arcuate cutting edge of an extent approximately one-half the circumference of the blank between the extremities of the long diameter thereof, the blade being provided with a convexed smooth or back edge opposite the cutting edge and forming a suitable rest for the hand of the operator, the blade being further formed with a plurality of holes for insertion of the fingers to constitute a grip in connection with the convexed back edge.

In testimony whereof he affixes his signature.

WILLIAM H. JOYNER.